(12) United States Patent
Bates et al.

(10) Patent No.: US 7,403,350 B2
(45) Date of Patent: Jul. 22, 2008

(54) MULTIPLE SERVO SENSOR CONFIGURATION FOR MAGNETIC TAPE TIMING BASED SERVO

(75) Inventors: Allen Keith Bates, Tucson, AZ (US); Nhan Xuan Bui, Tucson, AZ (US); Mark Allan Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 11/535,328

(22) Filed: Sep. 26, 2006

(65) Prior Publication Data
US 2008/0074779 A1 Mar. 27, 2008

(51) Int. Cl.
G11B 5/02 (2006.01)
G11B 5/09 (2006.01)
G11B 21/02 (2006.01)
G11B 5/584 (2006.01)
G11B 5/55 (2006.01)

(52) U.S. Cl. .............................. 360/29; 360/39; 360/75; 360/77.12; 360/78.02

(58) Field of Classification Search ....................... None
See application file for complete search history.

(56) References Cited

U.S. PATENT DOCUMENTS

| | | | |
|---|---|---|---|
| 5,262,908 A | 11/1993 | Iwamatsu et al. | 360/77.12 |
| 6,005,737 A | 12/1999 | Connolly et al. | 360/75 |
| 6,031,673 A | 2/2000 | Fasen et al. | 360/53 |
| 6,754,026 B1 * | 6/2004 | Koski | 360/73.04 |
| 6,879,457 B2 | 4/2005 | Eaton et al. | 360/75 |
| 6,999,269 B2 | 2/2006 | Johnson et al. | 360/77.12 |
| 7,002,763 B2 * | 2/2006 | Bui et al. | 360/48 |
| 7,035,040 B2 * | 4/2006 | Molstad et al. | 360/77.12 |
| 7,139,151 B2 * | 11/2006 | Johnson et al. | 360/77.12 |
| 7,142,389 B2 * | 11/2006 | Nakao | 360/77.12 |
| 7,170,702 B2 * | 1/2007 | Ohtsu | 360/48 |
| 7,190,551 B2 * | 3/2007 | Suda | 360/121 |
| 7,206,170 B2 * | 4/2007 | Yip | 360/241.1 |
| 2006/0044671 A1 | 3/2006 | Weber et al. | 360/77.12 |

\* cited by examiner

*Primary Examiner*—K. Wong
(74) *Attorney, Agent, or Firm*—John H. Holcombe

(57) ABSTRACT

Multiple servo sensors are laterally displaced over a distance less than the transverse width of timing based servo track laterally extending transitions. The servo sensors are configured to sense the transitions, and servo detection logic detects the relative timings of the laterally extending transitions sensed by the laterally displaced servo sensors as the magnetic tape is moved in the longitudinal direction. Logic is configured to determine from the relative timings of the sensed transitions for at least one known set of laterally extending transitions having differing slants, the lateral position of a servo sensor by employing the relative timing detected from one servo sensor and the relative timing detected from another servo sensor, or determine the longitudinal velocity of the magnetic tape by determining the difference between the relative timing detected from one servo sensor and the relative timing detected from another servo sensor.

20 Claims, 7 Drawing Sheets

MULTIPLE SERVO SENSOR CONFIGURATION FOR MAGNETIC TAPE TIMING BASED SERVO

DOCUMENT INCORPORATED BY REFERENCE

Commonly assigned U.S. Pat. No. 5,689,384 is incorporated for its showing of a timing based servo system.

FIELD OF THE INVENTION

This invention relates to servoing for magnetic tape, and more particularly, to servoing for magnetic tape having timing based servo track(s) extending in the longitudinal direction of the magnetic tape.

BACKGROUND OF THE INVENTION

Magnetic tape provides a means for physically storing data to longitudinal tracks of a magnetic tape moved longitudinally with respect to read and/or write heads. One method for maximizing the amount of data that can be stored is to maximize the number of parallel tracks on the media, and that is typically accomplished by employing servo systems which provide track following and allow the tracks to be spaced very closely. Another method for maximizing the amount of data that can be stored is to maximize the amount of data that can be stored on an individual track, and often the recording and detection arrangements require that the longitudinal movement of the magnetic tape be kept relatively constant in order to maximize the data density of a track. Still another method for maximizing the amount of data that can be stored is to maximize the amount of magnetic tape that can be provided on a reel, for example, by making the magnetic tape thinner. The thin magnetic tape is more sensitive to variations in the longitudinal movement of the tape by a drive system, requiring that the longitudinal movement of the magnetic tape be kept relatively constant in order to avoid stretching of the tape or having slack in the tape.

Timing based servo systems allow both objectives to be attained. An example of a timing based servo system is the incorporated U.S. Pat. No. 5,689,384. A timing based servo system is employed, for example, with the Linear Tape Open (LTO) format, one example comprising the IBM LTO Ultrium magnetic tape drive and associated tape cartridge. A linear servo track comprises a pattern, for example, of prerecorded magnetic transitions or edges of stripes forming a timing based servo pattern of a repeating cyclic periodic sequence of transitions of two different slants or azimuthal orientations that extend laterally over the linear servo track. For example, the pattern may comprise transitions slanted, or having an azimuthal orientation, in a first direction with respect to the longitudinal direction of the linear servo track, alternating with transitions having different slants, for example, in the opposite direction. Thus, as the magnetic tape is moved with respect to a servo sensor in the longitudinal direction, the lateral positioning of the servo sensor with respect to the timing based servo track is sensed based on a measure of time between two transitions having different slants as compared to time between two transitions having parallel slants. The relative timing of the transitions read by the servo read head varies linearly depending on the lateral position of the head. Herein, the terms "slant", "slanted" or "slants" refer to any azimuthal orientation, including no slant, or a transition that is perpendicular to the longitudinal direction or parallel to the transverse direction.

The lateral position of a servo sensor with respect to the servo track may comprise a measure of time between two transitions having different slants, this distance called the "a" distance, as compared to time between two transitions having the same slant, this distance called the "b" distance. The servo tracks are typically generated by a servo writer having two spaced apart write elements of different slants, forming the "a" distance, which are pulsed simultaneously. Thus, the "a" geometric distance is determined photo lithographically, and is independent of the timing or the velocity of the servo writer drive.

With the servo writer utilizing two spaced apart elements with different slants, the writer generator is pulsed periodically with the period between pulses set so that, with the nominal tape velocity of the servo writer drive, the geometric distance between elements having the same slant (generated by the same element of the writer) is the "b" distance discussed above. Thus substantial error in the velocity of the tape by the servo writer drive or substantial error in the timing between the pulses, results in an error in the "b" distance and hence an error in the lateral position calculated based on the "b" pulse timing.

Further, the longitudinal velocity of the magnetic tape is determined based on measuring the timing between two transitions having the same slant, the "b" distance. Thus substantial error in the velocity of the tape by the servo writer drive or substantial error in the timing between the pulses, results in an error in the "b" distance and hence an error in the longitudinal velocity of the tape calculated based on the "b" pulse timing.

Error in the resultant spacing of the "b" transitions cannot be compensated for in the magnetic tape drive because the error is written into the magnetic tape in the servo pattern.

SUMMARY OF THE INVENTION

Magnetic tape drives with servo detectors operate with magnetic tape having at least one timing based servo track extending in the longitudinal direction of the magnetic tape and comprising laterally extending transitions at least some of which transitions have differing slants with respect to the lateral and longitudinal directions.

In one embodiment of a servo detector, a plurality of servo sensors are laterally displaced over a distance less than the transverse width of the timing based servo track laterally extending transitions, and the servo sensors are configured to sense the laterally extending transitions. Servo detection logic is configured to detect the relative timings of the laterally extending transitions sensed by the plurality of laterally displaced servo sensors as the magnetic tape is moved in the longitudinal direction. Logic is configured to determine from the relative timings of the sensed transitions for at least one known set of laterally extending transitions having differing slants, information regarding the relationship between the plurality of servo sensors and the magnetic tape.

One embodiment comprises two laterally displaced servo sensors.

Another embodiment comprises four laterally displaced servo sensors.

In a further embodiment, the logic is configured to determine from the relative timings between the transitions, information relating to the lateral position of at least one of the plurality of servo sensors by employing the relative timing detected from one servo sensor and the relative timing detected from another servo sensor.

In one embodiment, the logic is configured to divide the sum of relative timing detected from one servo sensor and the relative timing detected from the another servo sensor by two times the difference between the relative timing detected from the one servo sensor and the relative timing detected from another servo sensor.

In another embodiment, the logic is configured to divide the relative timing detected from the one servo sensor by the relative timing detected from another servo sensor.

In one embodiment, the logic is configured to determine the information relating to the lateral position from known slants of the laterally extending transitions, known separation distance between the detected servo sensors, and the relative timings between the transitions from the servo sensors.

In another embodiment, the logic is configured to determine information relating to the longitudinal velocity of the magnetic tape with respect to the plurality of servo sensors.

In one embodiment, the logic is configured to determine the information related to the longitudinal velocity by determining the difference between the relative timing detected from one servo sensor and the relative timing detected from another servo sensor.

An embodiment of a magnetic tape drive for reading and/or writing data with respect to magnetic tape having at least one timing based servo track extending in the longitudinal direction of the magnetic tape and comprising laterally extending transitions at least some of which transitions have differing slants with respect to the lateral and longitudinal directions, employs read and/or write heads configured to read and/or write data with respect to longitudinal tracks of a magnetic tape moved longitudinally with respect to the read and/or write heads. A drive system is configured to move a magnetic tape longitudinally with respect to the read and/or write heads. A servo system is configured to control the lateral position of the read and/or write heads with respect to the magnetic tape, and employs a plurality of servo sensors that are laterally displaced over a distance less than the transverse width of the timing based servo track laterally extending transitions, the servo sensors configured to sense the laterally extending transitions; servo detection logic configured to detect the relative timings of the laterally extending transitions sensed by the plurality of laterally displaced servo sensors as the magnetic tape is moved in the longitudinal direction; logic configured to determine from the relative timings of the transitions for at least one known set of laterally extending transitions having differing slants by the plurality of laterally displaced servo sensors, information relating to the lateral position of at least one of the plurality of servo sensors with respect to the magnetic tape, employing the relative timing detected from one servo sensor and the relative timing detected from another servo sensor; and a servo control configured to move the servo sensors and the read and/or write heads in the transverse direction of the magnetic tape in accordance with the information relating to the lateral position.

In another embodiment of a magnetic tape drive, the servo control logic is configured to determine from the relative timings of the transitions for at least one known set of laterally extending transitions having differing slants by the plurality of laterally displaced servo sensors, information relating to the longitudinal velocity of the magnetic tape with respect to the plurality of servo sensors, wherein the logic is configured to determine the information related to the longitudinal velocity by determining the difference between the relative timing detected from the one servo sensor and the relative timing detected from the another servo sensor; and a servo drive control is configured to operate the drive system to alter the longitudinal velocity of the magnetic tape in accordance with the information related to the longitudinal velocity.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
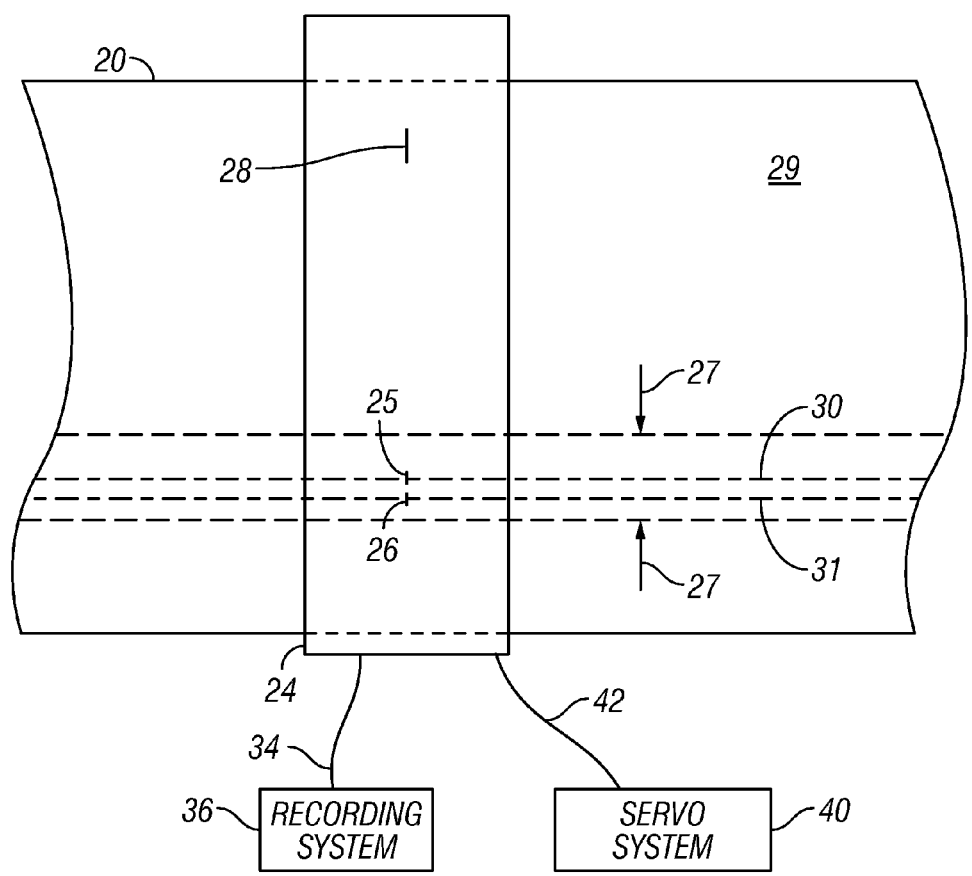
FIG. 1 is a diagrammatic illustration of a magnetic tape having a timing based servo track, and of a magnetic head and servo system of a magnetic tape drive having multiple servo sensors in accordance with the present invention.

Referring to FIG. 1, magnetic tape, such as magnetic tape 20 provides a means for storing data which is enhanced by maximizing the amount of data that is stored in a given length of tape. One method for maximizing the amount of data that can be stored is to maximize the number of parallel tracks on the media, and that is typically accomplished by employing servo systems which provide track following and allow the data tracks to be spaced very closely. Another method for maximizing the amount of data that can be stored is to maximize the amount of data that can be stored on an individual track, and often the recording and detection arrangements require that the longitudinal movement of the magnetic tape be kept relatively constant in order to maximize the data density of a track. Still another method for maximizing the amount of data that can be stored is to maximize the amount of magnetic tape that can be provided on a reel, for example, by making the magnetic tape thinner. The thin magnetic tape is more sensitive to variations in the longitudinal movement of the tape by a drive system, requiring that the longitudinal movement of the magnetic tape be kept relatively constant in order to avoid stretching of the tape or having slack in the tape.

An example of track following servoing for magnetic tape 20 comprises the provision of prerecorded parallel longitudinal servo tracks 27 that lie between, or are offset from, groups of longitudinal data tracks 29. A head assembly 24 is shown in solid lines comprises a set of read and/or write heads configured to read and/or write with respect to sets of the longitudinal data tracks 29, and the servo system 40 causes the head assembly 24 to track follow along a path within the servo track 27 such that the read and/or write heads maintain a path along corresponding data tracks.

Figure 2:
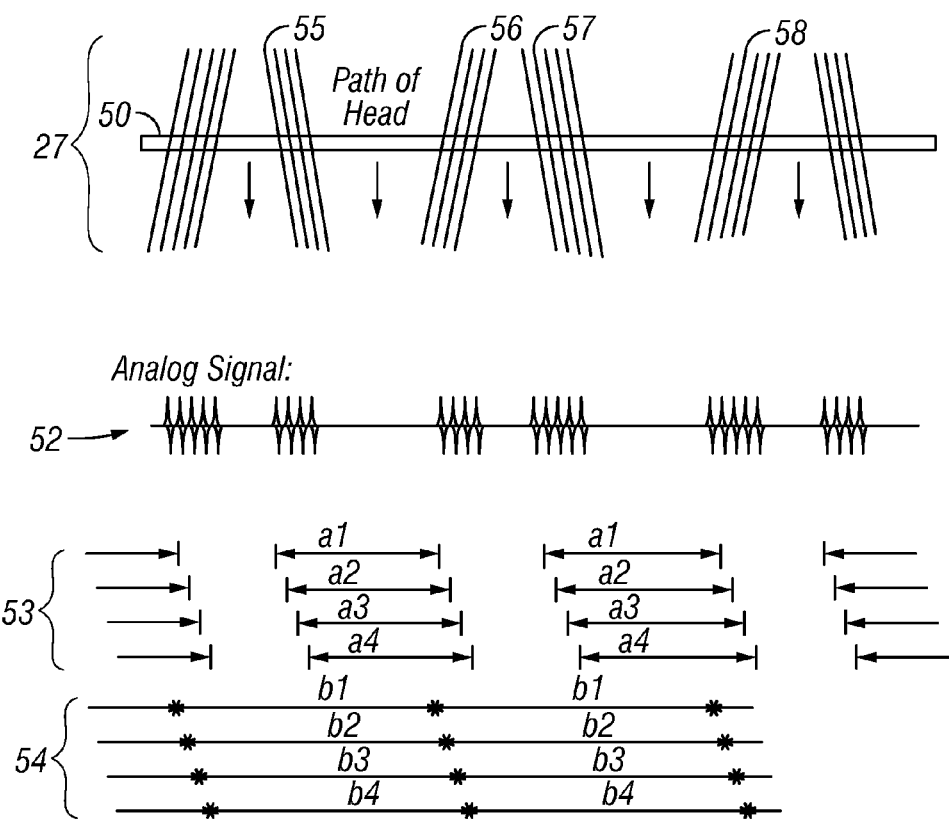
FIG. 2 is a diagrammatic illustration of a prior art servo head as it tracks a timing based servo track along with the head output signal and the corresponding a and b signal intervals.

As discussed in the incorporated U.S. Pat. No. 5,689,384, timing based servo tracks, such as track 27, provide a basis for track following which allows a close spacing of the data tracks 29. Referring to FIG. 2, a linear servo track 27 comprises a sensible pattern of prerecorded transitions forming a timing based servo pattern of a repeating cyclic periodic sequence of transitions of two different slants (or different azimuthal orientations) that extend laterally across the linear servo track. Those skilled in the art will recognize that the dark slanted stripes represent magnetized areas of recorded magnetic flux that extends across the width of a servo track 27, and that the edges of the stripes comprise flux transitions that are detected to generate a servo sensor signal. The transitions have two magnetic polarities, on each edge of a stripe. When a servo sensor crosses a transition of servo track 27, e.g. along path 50, it produces an analog signal pulse 52 whose polarity is determined by the polarity of the transition. For example, the servo sensor may produce positive pulses on the leading edge of each stripe (on encountering the transition of encountering the stripe), and negative pulses of the trailing edge (on encountering the transition on leaving the stripe). To reduce the chance for error, the servo system times only intervals between magnetic flux transitions having the same polarity. As one example, only transition pulses generated by the servo sensor in moving across the leading edge of a stripe are used, and transition pulses generated by moving across the trailing edge of a stripe are ignored. Hence, herein, the term "transition" refers to edges of stripes, or equivalent, that result in the generation of signals having the same polarity.

As discussed above, the pattern may comprise transitions slanted, or having an azimuthal orientation, in a first direction with respect to the servo track are paired with transitions slanted, or having an azimuthal orientation, in the opposite direction. Thus, as the magnetic tape is moved in the longitudinal direction with respect to the servo sensor to trace a path 50, the lateral positioning of the servo sensor with respect to the timing based servo track is sensed based a measure of time between two transitions having different slants 53, called "a" intervals, and, in the prior art, as compared to the time between two transitions having parallel slants 54, called "b" intervals.

The relative timing of the transitions varies linearly depending on the lateral position of the path 50 traced by the servo sensor. Thus, a number of sets of parallel data tracks may be aligned with different lateral positions across the servo track 27.

The servo tracks are typically generated by a servo writer having two spaced apart write elements of different slants, forming the "a" distance, which are pulsed simultaneously. Thus, the "a" geometric distance is determined photo lithographically, and is independent of the timing or the velocity of the servo writer drive.

With the servo writer utilizing two spaced apart elements with different slants, the writer generator is pulsed periodically with the period between pulses set so that, with the nominal tape velocity of the servo writer drive, the geometric distance between elements having the same slant (generated by the same element of the writer) is the "b" distance discussed above. Thus substantial error in the velocity of the tape by the servo writer drive or substantial error in the timing between the pulses, results in an error in the "b" distance and hence an error in the lateral position calculated based on the "b" pulse timing.

Further, the longitudinal velocity of the magnetic tape is determined based on measuring the timing between two transitions having the same slant, the "b" distance. Thus any error in the velocity of the tape by the servo writer drive or any error in the timing between the pulses, results in an error in the "b" distance and hence an error in the longitudinal velocity of the tape calculated based on the "b" pulse timing.

Any error in the resultant spacing of the "b" transitions cannot be compensated for in the magnetic tape drive because the error is written into the magnetic tape in the servo pattern.

Referring to FIG. 1, in accordance with the present invention, a plurality of servo sensors 25 and 26 are laterally displaced over a distance less than the transverse width of timing based servo track laterally extending transitions 27, and the servo sensors 25 and 26 are configured to sense the laterally extending transitions. Servo detection logic of servo system 40 is configured to detect from the signals supplied on lines 42, the relative timings of the laterally extending transitions, specifically including the transitions having differing slants, sensed by the plurality of laterally displaced servo sensors 25 and 26 as the magnetic tape is moved in the longitudinal direction. Logic is configured to determine from the relative timings of the sensed transitions for at least one known set of laterally extending transitions having differing slants, the "a" distance, by the plurality of laterally displaced servo sensors 25 and 26, information regarding the relationship between the plurality of servo sensors and the magnetic tape.

Figure 3:
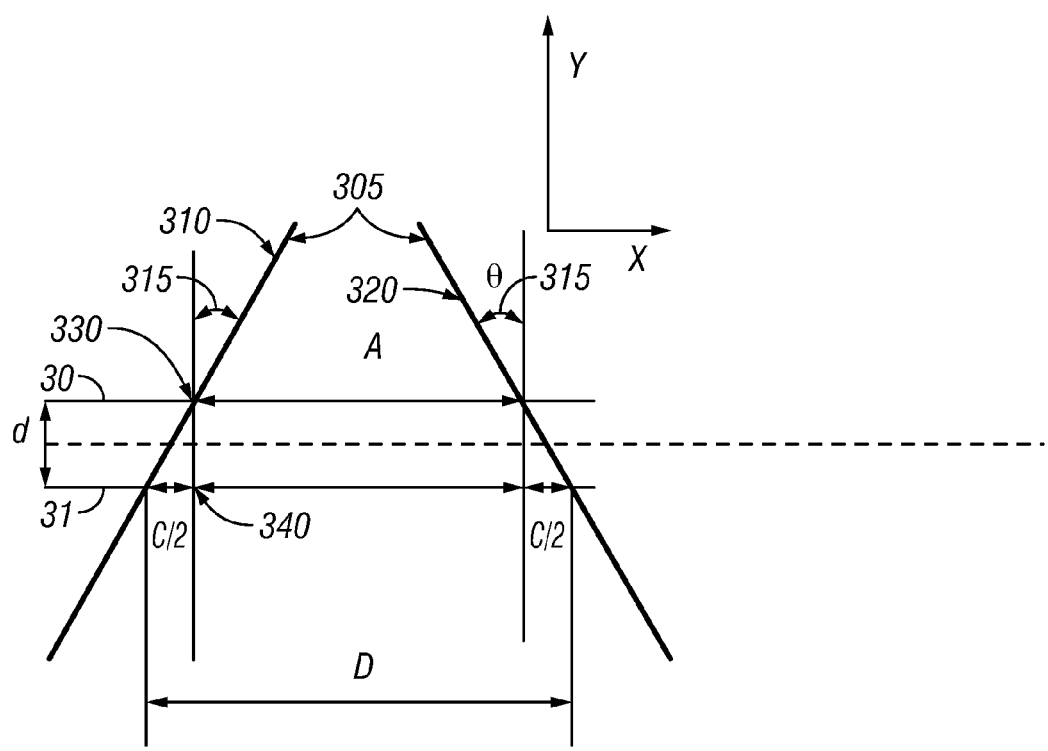
FIG. 3 is a diagrammatic illustration of multiple servo sensors of FIG. 1 as they track two transitions of a timing based servo track.

Referring additionally to FIG. 3, the servo sensors 25 and 26 trace paths 30 and 31, and are shown as positioned a points 330 and 340, perpendicular to the direction of the servo track, and laterally displaced from each other by a distance "d". The "a" distances are traced by the servo sensors as they encounter a servo pattern 305 of a pair of differently slanted transitions 310 and 320 along paths 30 and 31, and the "a" distances are different due to the slant(s) 315 of the transitions. Because the servo pattern 305 is written at the same instant in time by the servo writer, tape velocity variations in the writing process do not affect the distance between transitions 310 and 320. As pointed out above, the "a" distances are determined photo lithographically, and are independent of the timing or the velocity of the servo writer drive.

For the purpose of illustration herein, the measured timing of the distance traced along path 30 by one of the plurality of servo sensors is called the "A" distance, and the measured timing of the distance traced along path 31 by another of the plurality of servo sensors is called the "D" distance. The difference between the timings of the "A" distance and the "D" distance due to the slant(s) 315 of the transitions 310 and 320 comprises the "C" distance.

Because the timing is measured between the transitions 310 and 320 (which are written at the same time) to obtain "C", which serves a purpose similar to the "b" distance of the prior art, no servo errors are introduced by velocity variations in the write process.

In one embodiment, the logic is configured to determine from the relative timings between the transitions, information relating to the lateral position of at least one of the plurality of servo sensors, for example called "PES" for "position error signal", by dividing the sum of an amount related to the relative timing detected from one of the servo sensors and an amount related to the relative timing detected from another of the servo sensors by two times their difference, or $$PES=(A+D)/(2*C).$$

Alternatively, the equation may be presented as:

$$PES=(A+D)/(2*(A-D)).$$

As is known to those of skill in the art, the term "PES" is a term used in describing the position of the servo head, or in describing the difference between the current position of the servo head and the desired position of the servo head. The actual signal provided to the servo actuator in the servo control is the signal to reduce the difference between the current position of the servo head and the desired position of the servo head, but takes into consideration the characteristics of the servo actuator. The PES may be calculated in each instance and the needed error signal calculated from the result, or, more likely, comprises a table or equivalent, where the timings are entered and the required error signal is provided as an output of the table.

Still alternatively, PES may be determined by dividing the relative timing detected from one servo sensor by the relative timing detected from another servo sensor.

PES=$A/D$, where the slant is great, that is $A/D$ becomes <1.

Specifically, the PES calculated in this manner, nonlinear with a small slant, becomes more linear as $A/D<1$. The geometry of this calculation will be discussed.

Referring to FIGS. 2 and 3, it is apparent that the servo pattern 27 on the magnetic tape 20 comprises repeated servo patterns 305 of pairs of differently slanted transitions 310 and 320. As is known to those of skill in the art, many of the single servo patterns 305 may be summed to obtain random noise reductions.

Referring to FIGS. 1 and 3, in another embodiment, the velocity of the magnetic tape, instead of being calculated based on the "b" distance as in the prior art, which can be erroneous due to variations in the "b" distance by the servo writer, is determined based on measuring the "C" distance of a servo pattern 305 of a pair of differently slanted transitions 310 and 320 along paths 30 and 31. As discussed above, the timings of the "A" and "D" distances for the paths 30 and 31 are different due to the slant(s) 315 of the transitions, resulting in the "C" distance. Because the servo pattern 305 is written at the same instant in time by the servo writer, tape velocity variations in the writing process do not affect the distance between transitions 310 and 320. As pointed out above, the "a" distances are determined photo lithographically, and are independent of the timing or the velocity of the servo writer drive.

In one embodiment, the tape velocity is determined as proportional to "C", where Tape velocity~C=A–D.

As is known to those of skill in the art, the actual signal provided to the servo actuator in the servo control is the signal to reduce the difference between the current velocity of the magnetic tape and the desired velocity of the magnetic tape, but takes into consideration the characteristics of the drive motors and the magnetic tape. The tape velocity may be calculated in each instance and the needed error signal to maintain the desired velocity calculated from the result, or, more likely, comprises a table or equivalent, where the timings are entered and the required error signal is provided as an output of the table.

Referring to FIGS. 2 and 3, it is apparent that the servo pattern 27 on the magnetic tape 20 comprises repeated servo patterns 305 of pairs of differently slanted transitions 310 and 320. As is known to those of skill in the art, many of the single servo patterns 305 may be summed to obtain random noise reductions.

Figure 4:
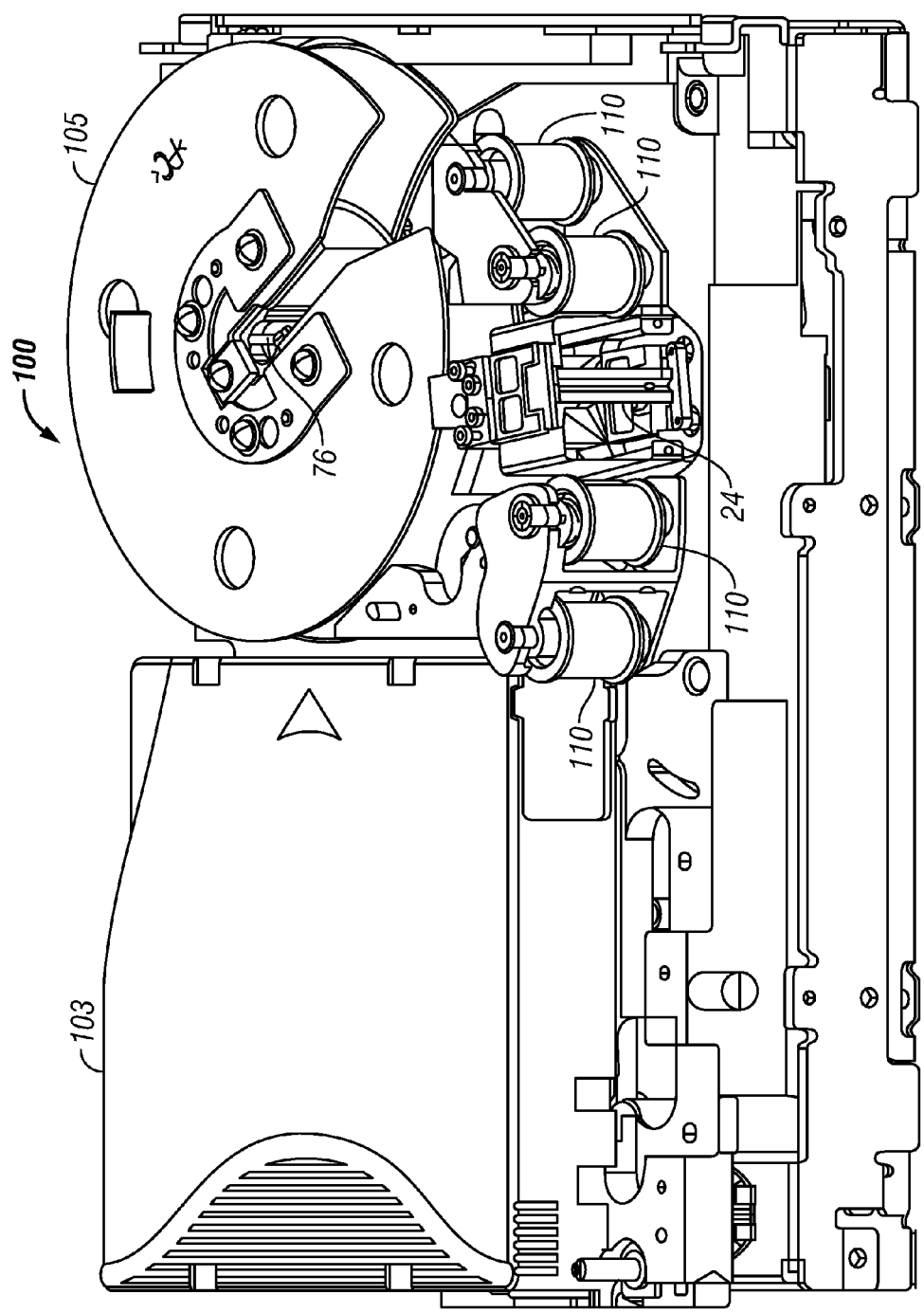
FIG. 4 is an illustration of a magnetic tape drive which may implement the present invention.
Figure 5:
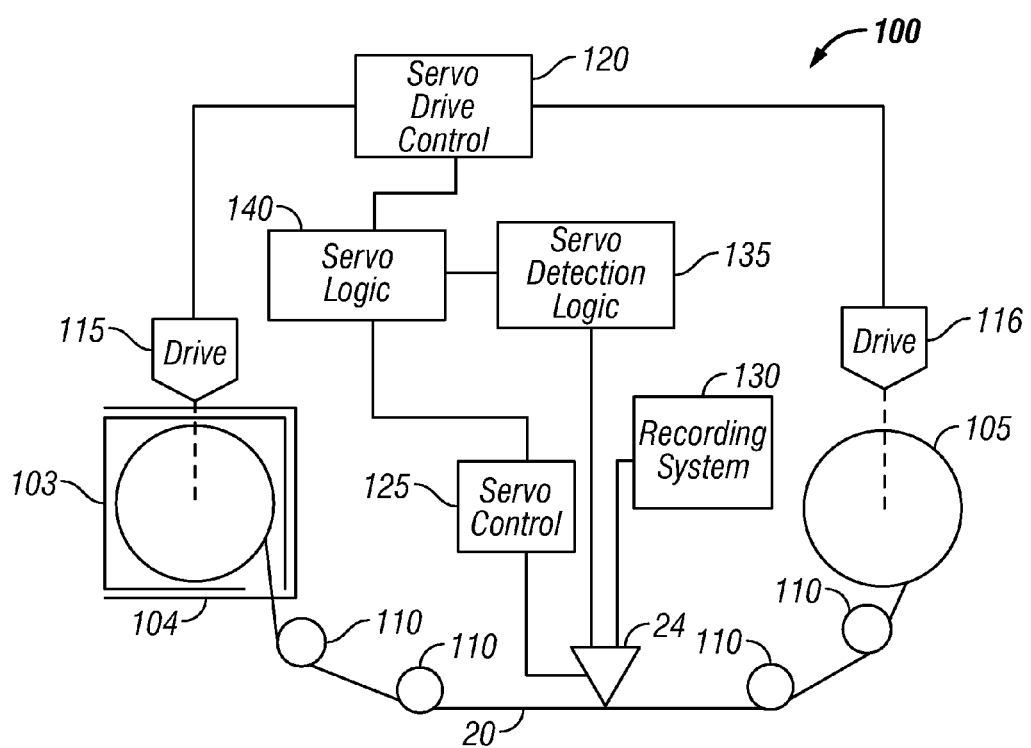
FIG. 5 is block diagrammatic illustration of the magnetic tape drive of FIG. 4.

A magnetic tape drive 100 is illustrated in FIGS. 4 and 5 configured to read and/or write data to a magnetic tape 20, for example, from a magnetic tape cartridge 103. A cartridge receiver 104 is configured to receive the magnetic tape cartridge 103, and the magnetic tape 20 is guided along a tape path from the magnetic tape cartridge, past a magnetic head assembly 24, to a take up reel 105. The magnetic tape 20 may be guided by tape guide rollers 110 along the tape path and constrained laterally by the tape guide rollers as the magnetic tape is moved longitudinally between the magnetic tape cartridge and the take up reel, for example, by a drive system comprising drive motors 115 and 116 and a servo drive control 120.

Although the magnetic tape is constrained laterally by the guide rollers 110, some minor lateral movement may still occur at the magnetic tape head assembly 24. Further, the magnetic tracks may have some minor transverse movement on the magnetic tape. A servo control 125 is configured to move the magnetic tape head assembly 24, comprising the servo sensors 25 and 26 and read and/or write heads 28 of FIG. 1, in the transverse direction of the magnetic tape 20 in accordance with the information relating to the lateral position, discussed above, for example, to track follow the servo tracks of the magnetic tape. A recording system 130 operates the read and/or write heads to read and/or write data with respect to the magnetic tape 20 as the magnetic tape is moved longitudinally by the drive system 115, 116, 120, as is known to those of skill in the art.

The servo drive control 120 is configured to operate the drive motors 115 and 116 to maintain the longitudinal movement of the magnetic tape relatively constant as the magnetic tape is unwound from one reel and wound onto the other reel, with the radius of the tape on each reel constantly changes, as is known to those of skill in the art.

The servoing of the magnetic tape head assembly and of the drive motors is accomplished by employing a timing based servo as discussed above. In one example, the servo system is configured to control the lateral position of the read and/or write heads with respect to the magnetic tape, and employs a plurality of servo sensors 25 and 26 of FIG. 1 that are laterally displaced over a distance less than the transverse width of timing based servo track laterally extending transitions of servo track 27. Servo detection logic 135 of FIG. 5 is configured to detect the relative timings of the laterally extending transitions sensed by the laterally displaced servo sensors as the magnetic tape is moved in the longitudinal direction. Logic 140 is configured to determine from the relative timings of the transitions for at least one known set of laterally extending transitions having differing slants, information relating to the lateral position of at least one of the plurality of servo sensors with respect to the magnetic tape, employing the difference between the relative timing detected from one servo sensor and the relative timing detected from another servo sensor, as discussed above. Servo control 125 is configured to move the servo sensors and the read and/or write heads in the transverse direction of the magnetic tape in accordance with the information relating to the lateral position.

In another example, the servo control logic is configured to determine from the relative timings of the transitions for at least one known set of laterally extending transitions having differing slants by the plurality of laterally displaced servo sensors, information relating to the longitudinal velocity of the magnetic tape with respect to the plurality of servo sensors. Logic 140 of FIG. 5 is configured to determine the information related to the longitudinal velocity by determining the difference between the relative timing detected from one servo sensor and the relative timing detected from another servo sensor; and servo drive control 120 is configured to operate the drive system to alter the longitudinal velocity of the magnetic tape in accordance with the information related to the longitudinal velocity.

Figure 6:
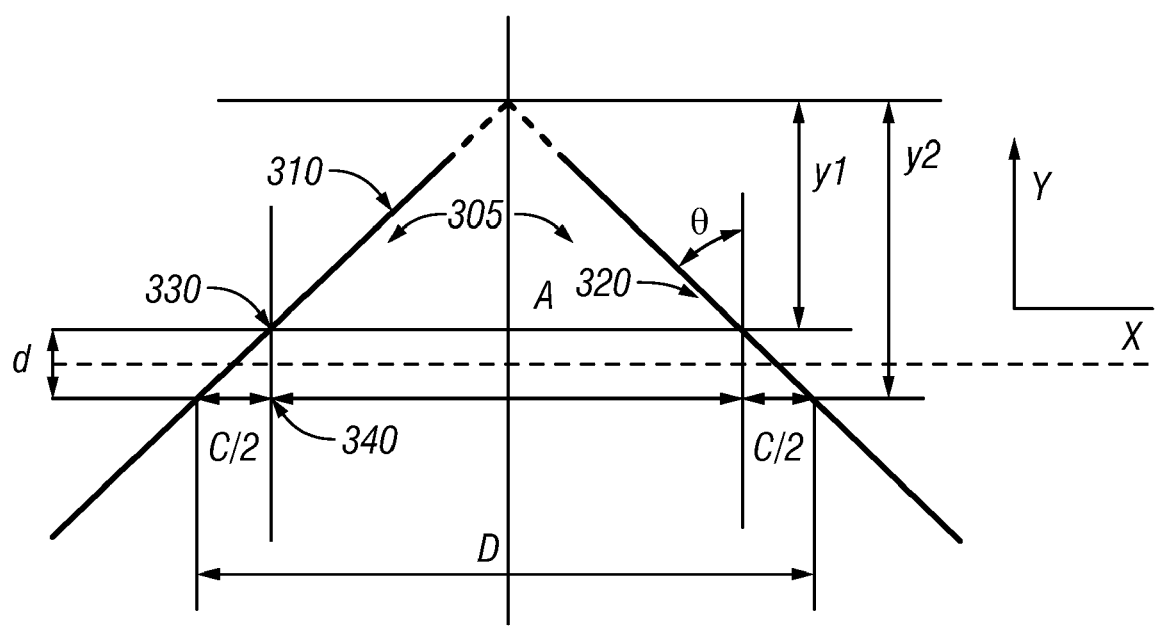
FIG. 6 is a diagrammatic illustration of the multiple servo sensors of FIG. 3, illustrating geometric relationships.

FIG. 6 illustrates the geometry leading to the equation for the PES determined by dividing the relative timing detected from one servo sensor by the relative timing detected from another servo sensor.

PES=$A/D$, where the slant is high, that is $A/D$ becomes <1.

From the geometry, $A/(2*y1)$=tan θ=$D/(2*y2), y1/y2=A/D$, $Y1=A*y2/D, y2=d+y1, PES\sim y1=A*d/(D*(1-A/D))$.

This produces a nonlinear output for PES, however it becomes more linear as A/D becomes <1, meaning that the slants become high.

Figure 7:
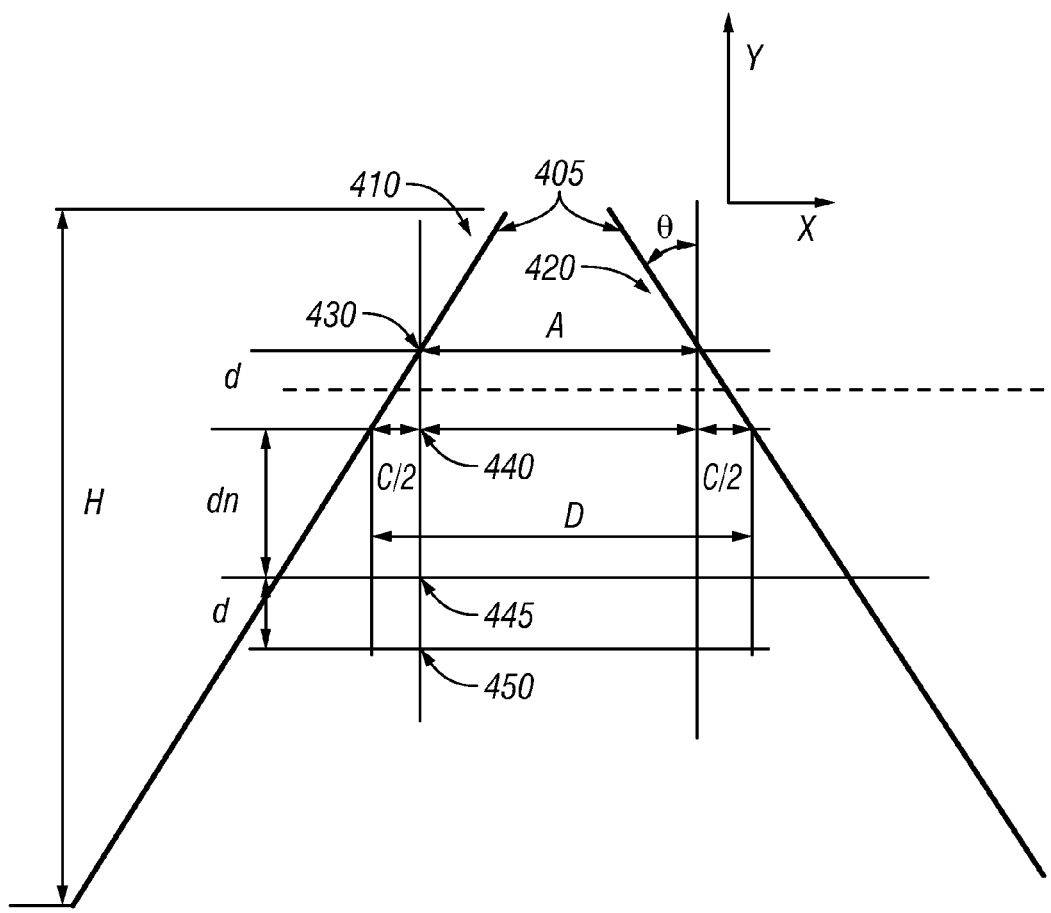
FIG. 7 is a diagrammatic illustration of a further embodiment of multiple servo sensors as they track two transitions of a timing based servo track.

Referring to FIG. 7, four servo sensors 430, 440, 445, 450, are provided to give full coverage of the laterally extending transitions 410 and 420, avoiding poor signal to noise ratios that may occur at or near the top or bottom of the laterally extending transitions 410 and 420. The servo sensors may be arranged in sets of 2, for example as servo sensors 430 and 440, and servo sensors 445 and 450, separated by a distance "dn". Servo detection logic 135 of FIG. 1 is configured to determine whether one set of servo sensors 430 and 440, or 445 and 450, is at or near the top or bottom of the laterally extending transitions 410 and 420, and switches to the other set of servo sensors. The PES and/or tape velocity error is then determined from the signals of the selected servo sensors as discussed above.

The logic discussed above may comprise any suitable logic arrangement known to those of skill in the art.

Those of skill in the art will understand that changes may be made with respect to the methods of determining the PES and the tape velocity error discussed above. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A servo detector for magnetic tape, said magnetic tape having at least one timing based servo track extending in the longitudinal direction of said magnetic tape and comprising laterally extending transitions at least some of which transitions have differing slants with respect to said lateral and longitudinal directions; comprising:

a plurality of servo sensors laterally displaced over a distance less than the transverse width of said timing based servo track laterally extending transitions, said servo sensors configured to sense said laterally extending transitions;

servo detection logic configured to detect the relative timings of said laterally extending transitions sensed by said plurality of laterally displaced servo sensors as said magnetic tape is moved in said longitudinal direction; and logic configured to determine from said relative timings of said sensed transitions for at least one known set of laterally extending transitions having differing slants by said plurality of laterally displaced servo sensors, information regarding the relationship between said plurality of servo sensors and said magnetic tape.

2. The servo detector of claim 1, wherein said logic is configured to determine from said relative timings between said transitions as detected by said servo detection logic, information relating to the lateral position of at least one of said plurality of servo sensors.

3. The servo detector of claim 2, wherein said logic is configured to determine said information relating to said lateral position by employing said relative timing detected from one said servo sensor and said relative timing detected from another said servo sensor.

4. The servo detector of claim 3, wherein said logic is configured to divide the sum of relative timing detected from said one servo sensor and the relative timing detected from said another servo sensor by two times the difference between said relative timing detected from said one servo sensor and said relative timing detected from said another servo sensor.

5. The servo detector of claim 3, wherein said logic is configured to divide the relative timing detected from said one servo sensor by the relative timing detected from said another servo sensor.

6. The servo detector of claim 3, wherein said logic is configured to determine said information relating to said lateral position from known slants of said laterally extending transitions, known separation distance between said detected servo sensors, and said relative timings between said transitions from said servo sensors.

7. The servo detector of claim 1, wherein said logic is configured to determine information relating to the longitudinal velocity of said magnetic tape with respect to said plurality of servo sensors.

8. The servo detector of claim 7, wherein said logic is configured to determine said information related to said longitudinal velocity by determining the difference between said relative timing detected from said one servo sensor and said relative timing detected from said another servo sensor.

9. The servo detector of claim 1, wherein said plurality of laterally displaced servo sensors comprises two laterally displaced servo sensors.

10. The servo detector of claim 1, wherein said plurality of laterally displaced servo sensors comprises four laterally displaced servo sensors.

11. A magnetic tape drive for reading and/or writing data with respect to magnetic tape, said magnetic tape having at least one timing based servo track extending in the longitudinal direction of said magnetic tape and comprising laterally extending transitions at least some of which transitions have differing slants with respect to said lateral and longitudinal directions; comprising:

read and/or write heads configured to read and/or write data with respect to longitudinal tracks of a magnetic tape moved longitudinally with respect to said read and/or write heads;

a drive system configured to move a magnetic tape longitudinally with respect to said read and/or write heads; and a servo system configured to control the lateral position of said read and/or write heads with respect to said magnetic tape, comprising:

a plurality of servo sensors laterally displaced over a distance less than the transverse width of said timing based servo track laterally extending transitions, said servo sensors configured to sense said laterally extending transitions;

servo detection logic configured to detect the relative timings of said laterally extending transitions sensed by said plurality of laterally displaced servo sensors as said magnetic tape is moved in said longitudinal direction;

logic configured to determine from said relative timings of said transitions for at least one known set of laterally extending transitions having differing slants by said plurality of laterally displaced servo sensors, information relating to the lateral position of at least one of said plurality of servo sensors with respect to said magnetic tape, wherein said logic is configured to determine said information relating to said lateral position by employing said relative timing detected from one said servo sensor and said relative timing detected from another said servo sensor; and a servo control configured to move said servo sensors and said read and/or write heads in the transverse direction of said magnetic tape in accordance with said information relating to said lateral position.

12. The magnetic tape drive of claim 11, wherein said servo system logic is configured to divide the sum of relative timing detected from said one servo sensor and the relative timing detected from said another servo sensor by two times the difference between said relative timing detected from said one servo sensor and said relative timing detected from said another servo sensor.

13. The magnetic tape drive of claim 11, wherein said servo system logic is configured to divide the relative timing detected from said one servo sensor by the relative timing detected from said another servo sensor.

14. The magnetic tape drive of claim 11, wherein said plurality of laterally displaced servo sensors comprises two laterally displaced servo sensors.

15. The magnetic tape drive of claim 11, wherein said plurality of laterally displaced servo sensors comprises four laterally displaced servo sensors.

16. The magnetic tape drive of claim 11, wherein said servo system logic is configured to determine said information relating to said lateral position from known slants of said laterally extending transitions, known separation distance between said detected servo sensors, and said relative timings between said transitions from said servo sensors.

17. A magnetic tape drive for reading and/or writing data with respect to magnetic tape, said magnetic tape having at least one timing based servo track extending in the longitudinal direction of said magnetic tape and comprising laterally extending transitions at least some of which have differing slants with respect to said lateral and longitudinal directions; comprising:

read and/or write heads configured to read and/or write data with respect to longitudinal tracks of a magnetic tape moved longitudinally with respect to said read and/or write heads;

a drive system configured to move a magnetic tape longitudinally with respect to said read and/or write heads; and a drive servo system configured to control the longitudinal velocity of said magnetic tape with respect to said read and/or write heads, comprising:

a plurality of servo sensors laterally displaced over a distance less than the transverse width of said timing based servo track laterally extending transitions, said servo sensors configured to sense said laterally extending transitions;

servo detection logic configured to detect the relative timings of said laterally extending transitions sensed by said plurality of laterally displaced servo sensors as said magnetic tape is moved in said longitudinal, direction;

logic configured to determine from said relative timings of said transitions for at least one known set of laterally extending transitions having differing slants by said plurality of laterally displaced servo sensors, information relating to the longitudinal velocity of said magnetic tape with respect to said plurality of servo sensors, wherein said logic is configured to determine said information related to said longitudinal velocity by determining the difference between said relative timing detected from one said servo sensor and said relative timing detected from another said servo sensor; and a servo drive control configured to operate said drive system to alter said longitudinal velocity of said magnetic tape in accordance with said information related to said longitudinal velocity.

18. A servo system for a magnetic tape drive configured to read and/or write data with respect to longitudinal tracks of a magnetic tape; said magnetic tape having at least one timing based servo track extending in the longitudinal direction of said magnetic tape and comprising laterally extending transitions at least some of which have differing slants with respect to said lateral and longitudinal directions; comprising:

read and/or write heads configured to read and/or write data with respect to longitudinal tracks of a magnetic tape moved longitudinally with respect to said read and/or write heads;

a plurality of servo sensors laterally displaced over a distance less than the transverse width of said timing based servo track laterally extending transitions, said servo sensors configured to sense said laterally extending transitions;

servo detection logic configured to detect the relative timings of said laterally extending transitions sensed by said plurality of laterally displaced servo sensors as said magnetic tape is moved in said longitudinal direction;

logic configured to determine from said relative timings of said transitions for at least one known set of laterally extending transitions having differing slants by said plurality of laterally displaced servo sensors, information relating to the lateral position of at least one of said plurality of servo sensors with respect to said magnetic tape, wherein said logic is configured to determine said information relating to said lateral position by employing the relative timing detected from one of said servo sensors and the relative timing detected from another of said servo sensors; and a servo control configured to move said servo sensors and said read and/or write heads in the transverse direction of said magnetic tape in accordance with said information relating to said lateral position.

19. The servo system of claim 18, wherein said logic is configured to divide the sum of relative timing detected from said one servo sensor and the relative timing detected from said another servo sensor by two times the difference between said relative timing detected from said one servo sensor and said relative timing detected from said another servo sensor.

20. The servo system of claim 18, wherein said logic is configured to divide the relative timing detected from said one servo sensor by the relative timing detected from said another servo sensor.

* * * * *